United States Patent [19]

Wobbe

[11] Patent Number: 4,902,455
[45] Date of Patent: Feb. 20, 1990

[54] METHOD AND EXTRUSION APPARATUS FOR DEGASSING THERMOPLASTIC PLASTICS MATERIAL MELTS

[75] Inventor: Hans Wobbe, Burgdorf, Fed. Rep. of Germany

[73] Assignee: Hermann Berstorff Maschinenbau GmbH, Hanover, Fed. Rep. of Germany

[21] Appl. No.: 290,488

[22] Filed: Dec. 27, 1988

[30] Foreign Application Priority Data

Dec. 24, 1987 [DE] Fed. Rep. of Germany ....... 3744193

[51] Int. Cl.⁴ ..................... B29C 47/00; B29C 47/76; B29C 47/92
[52] U.S. Cl. .................................... 264/40.7; 264/102; 264/211.23; 366/75; 366/89; 366/99; 366/139; 366/323; 425/145; 425/203; 425/812
[58] Field of Search .................... 264/40.1, 40.3, 40.7, 264/102, 211.23, DIG. 78; 425/145, 146, 147, 149, 203, 812; 366/75, 89, 99, 139, 323

[56] References Cited

U.S. PATENT DOCUMENTS

| | | | |
|---|---|---|---|
| 3,391,232 | 7/1968 | Jackson | 264/40.7 |
| 3,704,972 | 12/1972 | Kneller et al. | 425/145 |
| 3,799,719 | 3/1974 | Bonikowski et al. | 425/149 |
| 3,992,500 | 11/1976 | Kruder et al. | 264/102 |
| 4,197,268 | 4/1980 | Anders | 264/40.1 |

FOREIGN PATENT DOCUMENTS

| | | | |
|---|---|---|---|
| 54-33565 | 3/1979 | Japan | 425/145 |
| 56-144139 | 11/1981 | Japan | 264/40.3 |
| 56-144943 | 11/1981 | Japan | 264/40.3 |
| 58-175641 | 10/1983 | Japan | 264/40.3 |
| 59-159328 | 9/1984 | Japan | 425/149 |
| 60-49916 | 3/1985 | Japan | 425/149 |
| 60-116424 | 6/1985 | Japan | 425/145 |
| 61-139413 | 6/1986 | Japan | 425/203 |
| 61-141526 | 6/1986 | Japan | 425/149 |
| 61-144327 | 7/1986 | Japan | 425/149 |

Primary Examiner—Jeffery Thurlow
Assistant Examiner—Leo B. Tentoni
Attorney, Agent, or Firm—Foley & Lardner, Schwartz, Jeffery, Schwaab, Mack, Blumenthal & Evans

[57] ABSTRACT

A method of degassing thermoplastic plastic melts over a wide range of viscosities in a degassing extruder including a plurality of sequential degassing sections. Each degassing section includes at least one screw section having flights formed thereon. Each section includes a degassing region and a metering section downstream thereof. The height and length with which the flights are filled in the degassing regions in the individual degassing sections is controlled by the comparison of a pressure gradient measured in the metering region of that section with a desired pressure gradient and on the basis of this, the melt is conveyed with substantially the same throughput capacity in each degassing section. As a result of these measures, the degassing is effected in all of the degassing sections with optimally partially filled screw threads and with an optimum filling length of the worm threads, which is independent of the viscosity of the melt. The number of flights, the depth and width of the flights and the pitch of the flights may be identical in all degassing sections thus simplifying the manufacture of the screw.

8 Claims, 2 Drawing Sheets

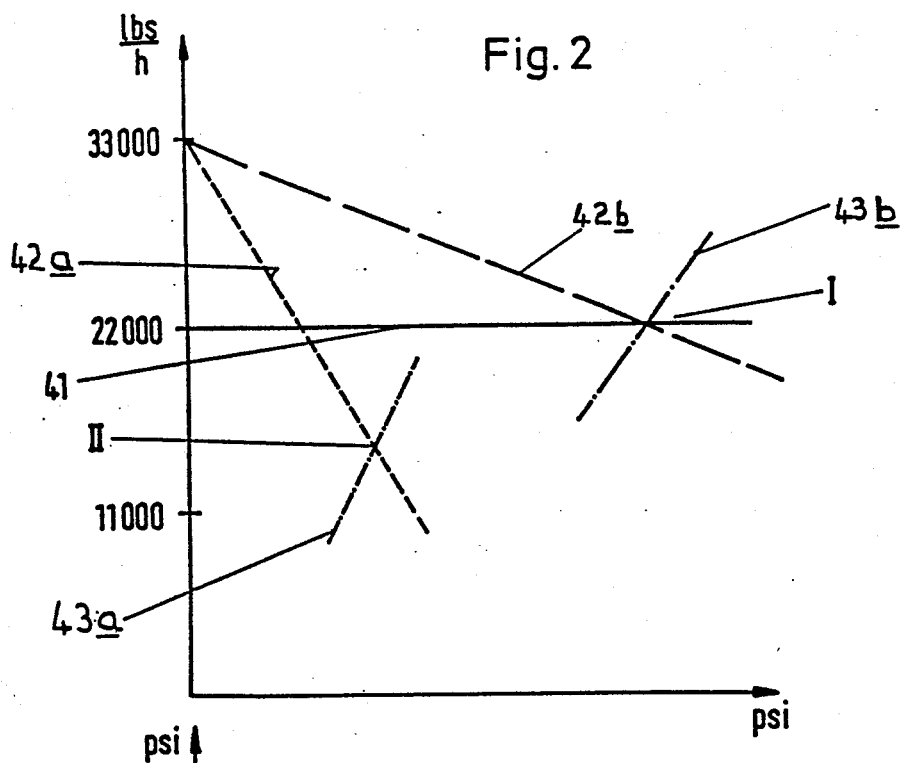
Fig. 2
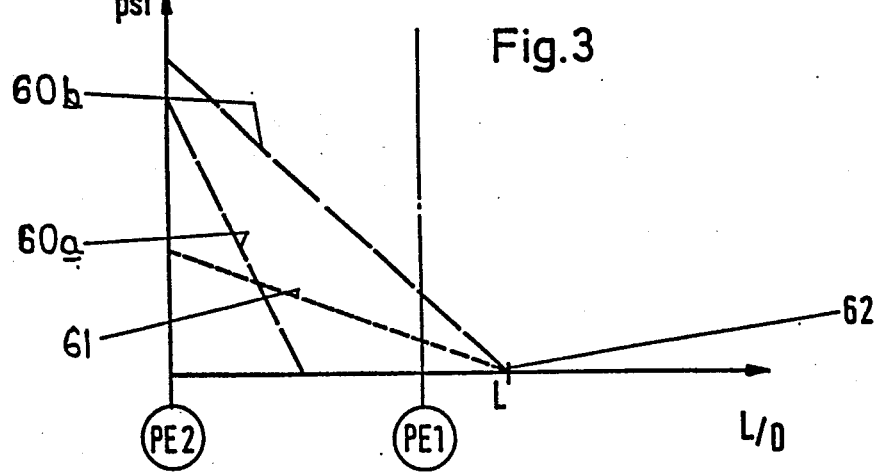
Fig. 3
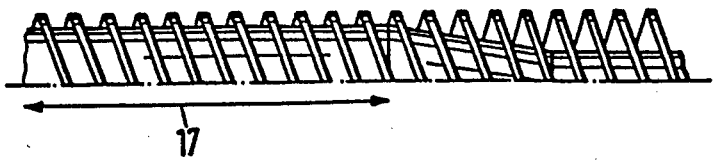

METHOD AND EXTRUSION APPARATUS FOR DEGASSING THERMOPLASTIC PLASTICS MATERIAL MELTS

FIELD OF THE INVENTION

The present invention relates to a method of degassing a thermoplastic plastic material melt in a degassing extruder having a plurality of degassing extruder sections which are connected in series with one another, each degassing section including a degassing region comprising degassing means, the melt being conveyed past the degassing means at a minimal extrusion pressure, the degassing being effected by the use of a reduced pressure or a vacuum, each degassing section further including a metering region disposed downstream of the degassing region and causing an elevated pressure to be applied to the melt. The present invention also relates to an apparatus suitable for carrying out such a method.

BACKGROUND OF THE INVENTION AND PRIOR ART DISCUSSION

Extruders capable of extremely efficient degassing are required for use in the preparation of bulk plastics materials, both for legal reasons and for the reasons of economy. Hence, the input melt material input must be degassed from a gas content of up to 15% to a content of less than 500 ppm when polymerizing the melt.

In U.S. Pat. No. 3,992,500 there is disclosed a typical known multi-stage degassing extruder in which a free volume is created under each degassing port by reducing the diameter of the screw core. So-called "metering zones", in which the screw core has a larger diameter in the region of the degassing ports, are provided downstream of the degassing zone so that, in these regions the melt is subjected to a high pressure, which pressure is lowered in the following degassing sections to permit and/or to cause degasification of the melt. The screw, in such an arrangement, must also have a large thread depth in the melt intake regions. In order to be able to build up a material pressure, the diameter of the screw core is enlarged in the metering zones which are connected downstream of the degassing zones but upstream of an adjacent intake section.

The manufacture of a screw of this type is very costly because it is necessary to provide the screw with core portions of greatly differing diameters each of which portions extends over an accurately predetermined longitudinal length of the screw. These lengths are of importance because a different conveying capacity is required of the screw in each degassing stage.

The rotational speed of the screw must be kept within a specific range. This is in order to prevent too large a quantity of melt from being conveyed into the degassing regions and hence being caused to enter into and through the degassing ports.

If, for example, it is calculated that the screw threads should only be half filled in the first degassing zone in order to obtain satisfactory degassing, a predetermined low rotational speed of the screw within the range must be maintained. At the same time, however, the depths of the thread in the subsequent sections of the screw must be designed to cope with a predetermined conveying capacity, which conveying capacity is dependent upon the prevailing number of screw threads, the depth of the screw thread, the pitch of the screw flight and the rotational speed. Such design is necessary to ensure that the essentially partial filling of the screw threads in the subsequent degassing section having deeply cut screw threads is achieved.

It is possible to commence with partial filling of the screw below the respective degassing ports if a predetermined ratio of the conveying capacities in the individual metering and degassing sections has been set. This ratio is determined by the appropriate design of the screw geometry. However, this calculated ratio of the conveying capacities is of little or no use when the rotational speed of the screw lies outside the above-referenced range.

Moreover, this calculated ratio for optimum operation of a degassing extruder also becomes of little use when one attempts to degas a material having a different melt-flow index, that is to say, having a different viscosity, in the extruder.

The rotational speed of the screw must be changed in order that the extruder is not restricted to degassing melts having specific, relatively narrow ranges of viscosities, assuming that there is no desire to alter construction of the screw once this has been established. The partial filling of the screw threads below the degassing ports, which is an optimum requirement for satisfactory degassing, is maintained, but only in one stage. The other degassing stages must then be operated with a lower than optimum filling of the screw threads. If this requirement is ignored, the melt passes into and through the degassing ports.

Although such a measure enables materials having different viscosities to be degassed by the same extruder, the user must accept that the output of the extruder is considerably reduced, since it is in only one stage that operation is carried out with the screw threads filled with the melt to an optimum degree. However, a reduction in the output of the degassing extruder is unsatisfactory. For the purpose of maintaining satisfactory degassing and to prevent the melt from passing into and through the other degassing ports, it is necessary to operate at a different screw rotational speed and hence also with a greatly differing output.

OBJECT OF THE INVENTION

The present invention seeks to provide a method of degassing melts and an apparatus suitable for carrying out such a method in which the optimum partial filling of the screw threads in the region of the degassing ports is maintained in all degassing stages while simultaneously ensuring that the maximum output of the degassing extruder is achieved, even if the melt to be degassed has greatly differing viscosities within a batch or if batches of differing viscosities are being treated.

SUMMARY OF THE INVENTION

According to the present invention, there is provided a method of degassing a thermoplastic plastic material melt in a degassing extruder having a plurality of degassing extruder sections which are connected in series with one another, each degassing section including a degassing region comprising degassing means, the melt being conveyed past the degassing means at a minimal extrusion pressure, the degassing being effected by the use of a reduced pressure or a vacuum, each degassing section further including a metering region disposed downstream of the degassing region and causing an elevated pressure to be applied to the melt, wherein the pressure gradient of the melt in each metering section is determined, which pressure gradient is compared with a desired pressure gradient, and controlling the degree to which the screw threads are filled with melt in both height and length in each degassing section in dependence upon said measured pressure gradient so as to cause the desired pressure gradient to be attained, the melt being conveyed at substantially the same throughput in each degassing section.

Also according to the present invention, there is provided a degassing screw extruder for degassing a thermoplastic plastic material melt comprising a plurality of degassing extruder sections, each section comprising a degassing region including a degassing port and means for providing a reduced pressure or vacuum for causing the gas in the material to pass through the port to degas the melt, and a metering region disposed downstream of the degassing region, at least one adjustable flow restrictor device being disposed between two adjacent degassing extruder sections and at least one melt pump associated with at least one of the degassing extruder sections, and a control device connected to the drive means for the screw, to the adjustable flow restrictor and to the melt pump, at least two melt pressure-measuring devices, spaced apart from one another in the direction of flow, being associated with each metering section for detecting the pressure gradient in said section, said measurements from each metering section being transmitted to the control device and compared with a desired pressure gradient whereby disparity between the measured and the desired pressure gradient in any metering section causes the control device to regulate at least one of rotational speed of the worm, the free throughflow cross section of the restrictor and the rotational speed of the melt pump, the screw sections each having a substantially equal number of threads, depth of thread, and flight pitch in each degassing extruder section.

A simple measurement of pressure taken in a metering region, disposed downstream of the corresponding region in an extruder degassing section may, for example, signal that the screw thread has been filled, at the pressure-measuring point at a measured pressure of 10 bar.

However, if a material of high viscosity is to be degassed, a far higher pressure of, for example, 100 bar would build up at the measuring point when filling the worm thread. Accordingly, it is difficult if not impossible, to utilize the measured value as a control. In the event of a high viscosity melt, a pressure of, for example, 100 bar may be indicated when the screw threads in the metering zone are full. However, when degassing a plastics material melt having a low viscosity, a pressure of 100 bar would mean that the preceding and following zones would be over-filled.

In the present invention, however, a pressure gradient can be determined by taking pressure measurements at spaced-apart locations in any extruder section. In such a case, a measured pressure of 10 bar at the entry of melt into the metering section and a measured pressure of 100 bar at a longitudinal spacing of three times the diameter of the screw downstream thereof may indicate a desired filling level.

By comparing the measured pressure gradient with a desired, predetermined pressure gradient and by controlling the conveying capacity through this extruder section on this basis it is then possible to establish reliably an optimum filling of the screw threads over the specific length of the screws in the relevant degassing stage, for example, the threads are two-thirds full. This treatment is therefore independent of the viscosity of the plastics melt being degassed at any given time.

If this particular degassing section is the most upstream section and has back degasification, that is to say, the evaporating gases are drawn off at the drive end of the screw, upstream of the material filling opening, the rotational speed of the worm and hence the conveying capacity are increased when corresponding pressure values are measured. This is in order to avoid a melt passing through the degasification port as a result of the increased conveying capacity in the first degassing section and to ensure a desired partial filling of the screw threads.

Hence, due to the determination of a pressure gradient in each degassing extruder section, very accurate filling of the screw threads in the degassing sections disposed below the degassing port can be achieved. By determining the pressure gradient and comparing it with the desired value, it is then possible to act upon the conveying capacity of the individual degassing sections in order to ensure a specific desired degree of partial filling of the screw threads. This can be achieved by, for example, varying the rotational speed of the screw with respect to the first degassing section, by controlling the free throughflow cross section at the end of this stage with respect to the conveying capacity in this stage, and by controlling the rotational speed of a melt pump or further restrictor device, disposed at the downstream end of the final degassing extruder section for the purpose of determining the conveying capacity in the preceding stage.

BRIEF DESCRIPTION OF THE DRAWINGS

One embodiment of an extrusion apparatus in accordance with the present invention will be further described, by way of example, with reference to the accompanying drawings, in which:

FIG. 2 is a graph in which the output of the extruder of FIG. 1 is plotted against the pressure subsisting therein; and FIG. 3 is a graph showing the pressure characteristic in a metering zone forming part of the extruder shown in FIG. 1.

DESCRIPTION OF PREFERRED EMBODIMENT

Figure 1:
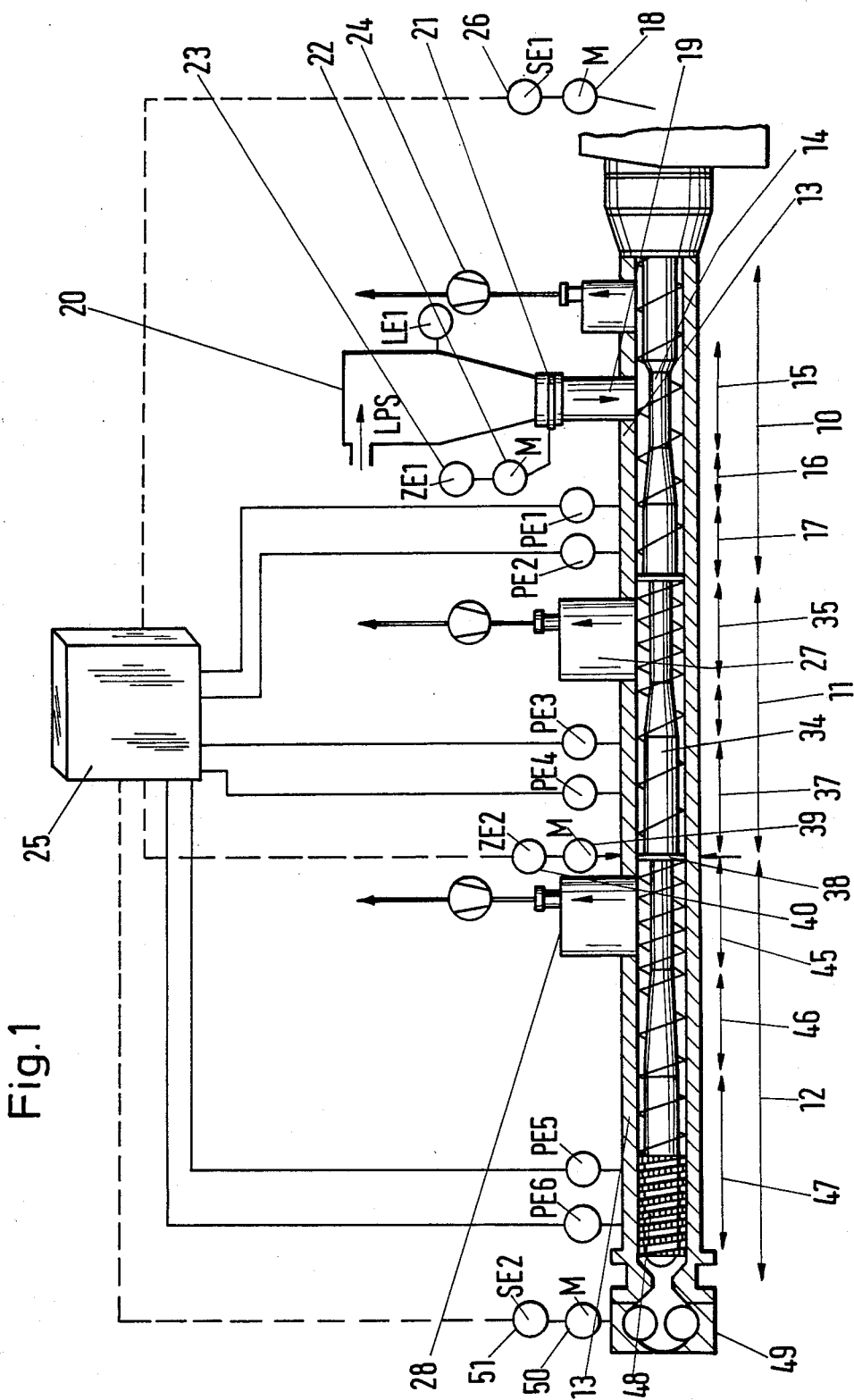
FIG. 1 is a schematic longitudinal sectional view through a degassing extruder in accordance with the present invention.

In FIG. 1, there is shown a three-stage degassing extruder, the three stages being schematically denoted by the lines 10, 11 and 12 appearing below the extruder. The extruder comprises a housing 13 in which screw sections rotate. In the first stage 10, screw section 14 rotates, the section 14 comprising an input section, a transition section and a metering section denoted schematically by the lines 15, 16 and 17 respectively shown below the extruder.

The screw section 14 is rotated by means of a motor 18 through a gear unit (not shown). A regulator 26 provided on the motor 18, which regulator is connector to a control unit 25.

The screw section 14, in the intake region 15, has a filling aperture 19 associated therewith. Disposed above the aperture 19 is disposed a melt separator 20. The separator 20 includes a metering slider 21 connected to a motor 22. A control device 23 is provided for controlling the free cross-sectional area of the metering slider 21.

A degasifier device 24 for producing a vacuum, and which is provided with a degassing dome, is provided at the drive end of the screw section 14.

In the region of the metering section 17, the first degassing stage 10 includes device PE1 and PE 2 for measuring the pressure of the melt. These pressure measurement devices are connected to the control unit 25.

In the second degassing stage 11, there is provided a degasifier 27 and a second screw section 34. The screw section 34 may be identical to the screw section 14 in the degassing stage 10 and to the screw section in the subsequent degassing stage 12 with respect to the pitch of the flight, the depth of the threads and the number of threads. In the embodiment shown, only the length of the metering section 37 is different from that of the metering section 17.

Pressure-measuring devices PE3 and PE 4 are associated with the metering section 37 of the second stage, both devices being connected to the control unit 25. The part of the screw in the input section 35 of the second stage 11 has deeply cut threads which must, in use, only be partially filled with melt in order to ensure satisfactory degasification.

A distributing slide valve 38, which is known and is therefore not described in further detail, is disposed at the end of the metering section 37 to permit the free flow-through cross-section around the worm to be increased or decreased. The valve 38 is driven by means of a motor 39 controlled by means of a regulator 40. The regulator 40 is also connected to the control unit 25.

A degasifier 28 is provided in the third degassing stage 12 and is disposed above a screw section 45 having very deeply cut threads. A transition screw section 46 having a continuously decreasing thread depth and a metering section 47 having a uniform thread depth are disposed downstream of the screw section 45. In the embodiment shown, the metering section 47 is provided with additional mixer elements 48. However, these are preferable but not essential.

The metering section 47 also has two pressure-measurement devices PE 5 and PE 6 associated therewith and these are connected to the control unit 25. A geared pump 49 is disposed at the downstream end of the degassing stage 12, which pump is driven by a motor 50. The throughput of the stage is controlled by means of a regulator 51 connected to the control unit 25.

FIG. 2 is an output graph showing the maximum output obtainable.

As can be seen from FIG. 2, a single-screw extruder supplies a maximum output with an optimum depth of the thread if the component of the pressure-induced back flow corresponds to a third of the flow over the rear faces of the screw flights. This principle applies to each stage of a multi-stage system.

The problems which occur in attempting to achieve such optimum output are that the flights of the screw must be only partially filled in each degassing stage, and that a uniform optimum output must be achievable over a wide range of melt viscosities.

These conditions are fulfilled by appropriate control of the extruder of FIG. 1. The basis for such control is the fact that a pressure gradient is formed in each degassing stage. At least two pressure measurements are effected in each stage and, in dependence upon the measurements obtained, a specific control parameter for each degassing stage is activated so as to cause a desired pressure gradient to be attained. The parameters may be the rotational speed of the screw, the rotational speed of the melt pump, or the free throughflow cross section in the stage.

In FIG. 2, there are shown the extrusion characteristics of a high viscosity melt 42a and a low viscosity melt 42b. Also plotted in FIG. 2 are so-called "workpiece" characteristics 43a and 43b respectively. In this example, the "workpiece" characteristics are those of the slide valve 38 separating the second and third degassing zones. An alternative "workpiece" whose characteristics could be plotted is the gear pump 49. To attain maximum output, the intersection of the melt extrusion characteristic and the "workpiece" characteristic should lie on the line 41 representing, in this instance, an output of 22000 lbs/hr at a particular pressure. As can be clearly seen, the low viscosity melt extrusion characteristic 42b and the "workpiece" characteristic 43b do intersect, at I, on this line and, accordingly, maximum output would be obtained. If other parameters remained unchanged, however, the extruder would not produce a maximum output if a high viscosity melt 42a was employed. In such a case, an output only 15,000 lbs/hr would be attained. For this reason, an adjustable control parameter is provided in each metering section, in this case, the metering section 37. By changing the rotational speed of the screw, the line 42a is displaced and by adjusting the throughflow cross section of the slide valve 38, the line 43a is also displaced and it is now simple to ensure that their point of intersection II lies on the maximum output 41.

In order to ensure partial filing of the screw threads in the respective degassing sections 15, 35, 45, the filling length of the respective associated metering sections 17, 37 and 47 must be limited, as is exemplified in FIG. 3.

In order to be able to distinguish between a low melt-viscosity, line 60, and a high melt-viscosity, line 61, two pressure measurement devices are fitted in each section, for example the devices PE1 and PE2 in the section 17, in order to detect the pressure gradient. Hence, distinguishing measures for the different viscosities are produced, so that the partial filling of the worm threads in the upstream degassing sections can be maintained, even in the case of greatly differing viscosities.

If the filling length does not correspond to the optimum value, adjustment is made, in this example, by altering the rotational speed of the extruder. Curve 60a of FIG. 3 shows that the filling length is too small. This is signalled to the control unit 25 by too low a pressure measured by PE2 and by the absence of a pressure measured by PE1. The rotational speed of the extruder is then reduced by the control unit 25, using the regulator 26 of the motor 18, until the filling length (as shown in FIG. 3) lies at its optimum point 62. This is because a reduction in the rotational speed of the screw decreases the conveying capacity in this region and accordingly the degree of filling of the melt in the worm threads increases again because the melt is being fed at a uniform rate from the separator 20. The line 60a in FIG. 3 therefore becomes line 60b.

The state of filling of the worm threads in the subsequent degassing stages 11 and 12 is controlled in a similar manner.

When the pressure-measuring devices PE3 and PE4 detect, for example, values in accordance with the curves 60a of FIG. 3, this is indicated to the control unit 25, This may in turn activate the motor 39 of the slide valve 38 by way of the regulator 40 so that the free throughflow cross-section is reduced. The measure reduces the conveying capacity in the degassing stage 11, independently of the rotational speed of the worm.

When a value larger than point 62 shown in FIG. 3 is reached, detected by the pressure measurement at points PE3 and PE4, and a corresponding pressure gradient is determined by the control unit 25, the control unit 25 acts upon the slide valve 38 in order to initiate a slight enlargement of the throughflow cross section. In such a case, similarly to the adjustments described hereinbefore the establishment of the desired pressure gradient results in a uniform filling height and filling length of the worm threads in section 35, independent of the viscosity of the melt. Accordingly, a maximum output is also ensured in this stage. In the case of an established screw geometry, that is, the depth of the threads and the flight pitch, the operation might otherwise be performed with only a very small degree of filling, so that there would be a considerable drop in output.

The procedure is the same in the last degassing stage 12, but with the difference that the filling length and the filling height of the worm threads is determined by the rotational speed of a geared pump 49, the drive motor 50 for which is controlled by means of a regulator 51 connected to the control device 25.

The pressure gradient is, in this instance, formed by processing the pressure values determined by the measuring devices PE5 and PE6. By way of example, if there is detected too low a degree of filling of the screw threads in the degassing section 45, the rotational speed of the pump 49 is reduced by the control unit 25 through the regulator 51 and the drive motor 50. This causes the degree of filling of the screw threads to be increased until the determined pressure gradient coincides with the pre-calculated desired pressure gradient. This leads to an optimum degree of filling and the optimum filling length, corresponding to the point 62 in FIG. 3.

Thus, operation is always effected with the screw threads optimally filled and with a corresponding optimum filling length in all three degassing stages 10, 11 and 12. This is effected independently of the viscosities. Hence, with respect to the degassing performance, the degassing extruder operates optimally and independently of the viscosity of the melt. The extruder does not need to be readjusted when a material of a different melt viscosity is to be degassed.

Since work is performed at all times in all three stages 10, 11 and 12 with a maximum degree of filling which permits satisfactory degasification, the output of the extruder is also optimized. It is particularly pointed out that the screw geometry, that is, the depth and width of the threads and the pitch of the screw flight, can be the same in all three stages, thus providing considerable advantages in the manufacture of the screw.

I claim:

1. A method of degassing a thermoplastic plastic material melt in a degassing extruder comprising a plurality of degassing extruder sections connected in series with one another, each said degassing extruder section including housing means, screw means rotatable within said housing means, and means for rotating said screw means, said screw means including core means having a periphery and flight means of a predetermined depth helically disposed around the periphery of said core means, said screw means defining, within said housing means, a degassing region and a metering region disposed downstream of said degassing region in each said section, said degassing region including degassing means, said degassing means comprising degassing port means formed in said housing, means for producing a reduced pressure at said degassing port means and means for conveying said melt within said housing past said degassing port means at a minimal extrusion pressure; said metering region including means for producing an elevated pressure to be applied to said degassed melt and means for determining a pressure gradient in said metering region, comprising the steps of feeding said melt successively into and through each said section wherein said melt is degassed and subsequently subjected to said elevated pressure, determining said pressure gradient in each said metering region of each said section, comparing said measured pressure gradient, and controlling the height and length with which said flight means are filled with melt in each said degassing section in dependence upon said measured pressure gradient so as to cause said desired pressure gradient to be attained, the melt being conveyed at substantially the same throughput through each said degassing section.

2. A method as recited in claim 1, wherein said measured pressure gradient is determined by the taking of at least two successive measurements of the pressure of the melt in each said metering section at spaced intervals in the throughflow direction.

3. A method as recited in claim 1 wherein said extruder comprises at least a first upstream degassing section, a second intermediate degassing section and a third downstream degassing section, said first section including means for adjusting the rate of rotation of said screw means to vary the melt input; said extruder further comprising throughflow cross-section adjustment means disposed between said second and said third section and melt pump means disposed at said downstream end of said third section, said melt pump means including adjustment means for adjusting the rate of rotation of said melt pump; and wherein said extruder further includes control means for comparing said measured pressure gradients with said predetermined desired pressure gradients, said control means being operatively connected to said screw rotational rate adjustment means, said throughflow cross-section adjustment means and to said melt pump rotational rate adjustment means, said control means acting on said screw rotational rate adjustment means when said pressure gradient measured in said metering region of said first section differs from said desired pressure gradient so as to cause the input of said melt into said degassing region of said first section to be set at an optimum value; said control means acting on said throughflow cross-section adjustment means when said pressure gradient measured in said metering region of said second section differs from said desired pressure gradient so as to cause the throughflow cross-section at the end of the second metering section to be regulated whereby the optimum degree of filling of said melt in said flights of said screw in said second degassing region is maintained, and wherein said control means acts on said melt pump rotation rate adjustment means when said pressure gradient measured in said metering region of said third section differs from said desired pressure gradient to cause said melt pump rotation rate adjustment means to be regulated such that the optimum degree of filling of said flights of said screws in said third degassing region is maintained.

4. A method as recited in claim 1 wherein said substantially equal throughput conveyance through each said degassing section is effected by the geometry of said screw and by the rotational speed of said screw.

5. A method as recited in claim 4 wherein the screw providing said substantially equal throughput conveying capacity comprises at least one of an equal number of flights in each said section, the depth of said flights in each said section and the pitch of said flights in each said section.

6. A degassing screw extruder for degassing a thermoplastic plastic material melt comprising a plurality of longitudinally spaced degassing extruder sections, each section comprising housing means and screw means rotatable within said housing means, each said screw means comprising a core portion, having a periphery and flight means helically disposed around the periphery of said core portion, said screw means defining, within said housing, a degassing region and a metering region disposed downstream of said degassing region in each said section, said degassing region including degassing means, said degassing means comprising degassing port means formed in said housing and means for producing a reduced pressure at said port means and means for conveying said melt past said degassing port means at a minimal extrusion pressure, each said metering region including means for producing an elevated extrusion pressure to be applied to said degassed melt and at least two pressure measurement devices longitudinally spaced apart from one another for measuring the pressure of said melt in said metering region such that the pressure gradient between said measuring devices is determined, drive means for rotating said screw means in at least the upstream extruder section, means for adjusting the rate of rotation of said screw means, flow restrictor means disposed between two adjacent said extruder sections for controlling throughflow; means associated with said flow restrictor means for adjusting the throughflow cross-section of said restrictor means, melt pump means disposed at the downstream end of said extruder, said melt pump means including a melt pump, drive means for rotating said melt pump and means for adjusting the rate of rotation of said melt pump means; control means connected to said screw rotation rate adjustment means, to said throughflow cross-section adjustment means and to said melt pump rotation rate adjustment means; said control means also being connected to each said pressure measurement device whereby said pressure measurements from each said metering section are transmitted to said control device and are compared therein with a desired pressure gradient whereby disparity between said measured and said desired pressure gradient in any said metering section causes said control device to regulate at least one of said screw rotational rate adjustment means, said free throughflow cross-section adjustment means and said melt pump rotational speed adjustment means, said screw means having a substantially equal number of flights, depth of flight and flight pitch in each said degassing extruder section.

7. A degassing extruder as recited in claim 6, wherein said longitudinal spacing between said pressure measurement devices in each said metering section is from one to five times the core diameter of said screw.

8. A degassing extruder as recited in claim 6 wherein said melt pump disposed at said downstream end of said extruder is a gear pump.

* * * * *